United States Patent [19]

Schott et al.

[11] Patent Number: 4,716,502

[45] Date of Patent: Dec. 29, 1987

[54] HANDLEBAR SAFETY LIGHT

[75] Inventors: Roger A. Schott; Lawrence A. Schott, both of Redford, Mich.

[73] Assignee: Freedom Industries, Inc., Redford, Mich.

[21] Appl. No.: 928,092

[22] Filed: Nov. 7, 1986

[51] Int. Cl.⁴ ............................................... B62J 6/00
[52] U.S. Cl. ..................................... 362/72; 362/186; 362/194
[58] Field of Search ................. 362/72, 157, 186, 191, 362/194, 196, 202, 204, 205

[56] References Cited

U.S. PATENT DOCUMENTS 2,166,282 7/1939 Benjafield ........................... 362/186
2,729,740 1/1956 Davis .................................... 362/205

FOREIGN PATENT DOCUMENTS 2818973 11/1979 Fed. Rep. of Germany ...... 362/194

Primary Examiner—Margaret A. Focarino
Assistant Examiner—Noah Kamen
Attorney, Agent, or Firm—Barnes, Kisselle, Raisch, Choate, Whittemore & Hulbert

[57] ABSTRACT

A signal light for removable assembly to a bicycle handlebar or the like comprising a cylindrical battery shell of electrically non-conductive construction having a circumferential array of orthogonally spaced axially extending resilient arcuate ribs integrally projecting outwardly of the shell between the shell ends. Such ribs have an outer diameter for resilient press-fit insertion of the shell into a handlebar end, such that the ribs function simultaneously to retain the shell in the handlebar end, to center the shell therewithin, and to adapt to various internal diameter sizes of handlebars. A lamp has a base received into the open outer end of the shell and is retained thereon by a translucent lens which is press-fitted over the shell outer end. An electrically conductive strip extends externally of the shell from an inner end in spring-biased electrical contact with batteries within the shell to an outer end within the shell parallel to but spaced from the lamp base. A switch element carried for lateral sliding motion by the lens has a tab which projects through the shell wall to selectively cam the outer end of the conductive strip into electrical abutment or engagement with the lamp base for completing an electrical circuit through the batteries and lamp, or for releasing the strip end to its normal position spaced from the lamp base.

13 Claims, 8 Drawing Figures

U.S. Patent   Dec. 29, 1987   Sheet 1 of 1   4,716,502
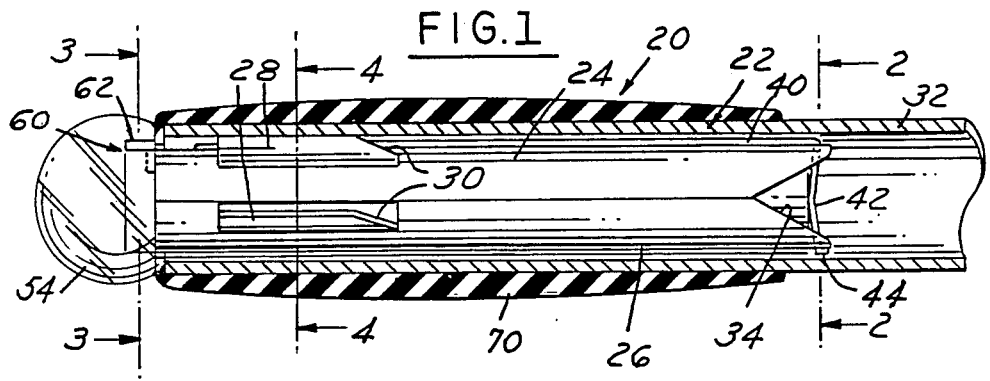
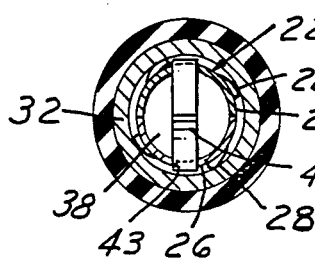
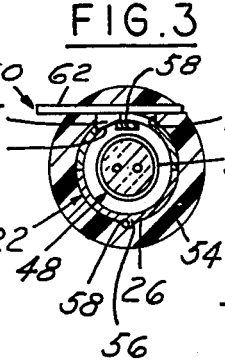
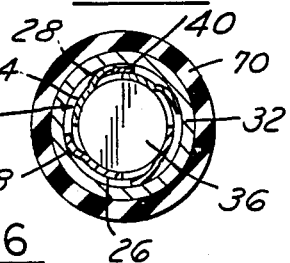
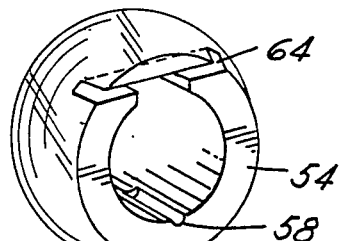
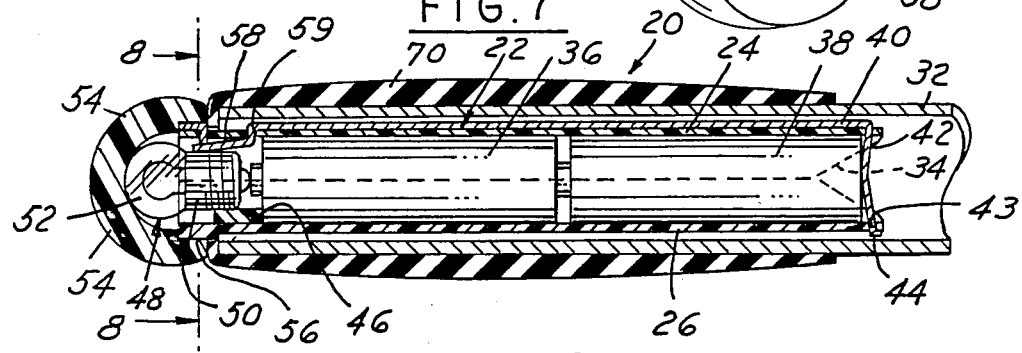
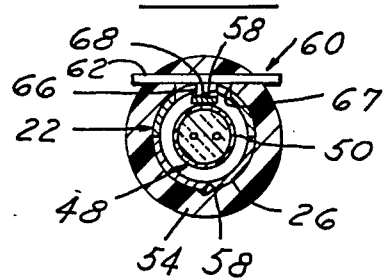

HANDLEBAR SAFETY LIGHT

BACKGROUND OF THE INVENTION

The present invention is directed to safety signal lights of a type adapted for disposition at the remote ends of a handlebar on a bicycle or like vehicle and possessing facility for manual energization to indicate presence of the vehicle to the rear after dark.

Signal lights of the described character, as heretofore proposed in U.S. Pat. Nos. 1,427,138, to Walicki et al 2,469,944, to Bauters 2,603,701, to Schadel 2,793,284, to Simoneit, German published application No. 1,111,969 (1961) and British Pat. No. 405,118 (1934), have generally been characterized by elaborate and expensive construction. Copending application Ser. No. 763,648, filed Aug. 8, 1985, now U.S. Pat. No. 4,623,954, by the inventors herein and assigned to the assignee hereof, discloses an improved signal light which comprises a battery shell of conductive sheet metal construction having cantilevered inwardly projecting tabs at one end for resilient electrical contact with batteries captured therewithin, and an opening at the opposing end for threadably receiving a lamp. The shell is contoured for sliding press-fit insertion into the open end of a tubular handlebar, with the longitudinally extending shell edges in sliding contact with the inside handlebar surface. A lens is mounted on the bulb of the lamp and has a head for endwise abutment with the handlebar end. A skirt integrally extends from the lens head surrounding the lamp and is closely received internally of the handlebar end for absorbing the shock of impacts on the handlebar end. Rotation of the lens brings the bulb into electrical contact with the batteries for energizing the bulb.

Although the signal light disclosed in such copending application represents a significant advance over earlier art, some problems were encountered in commercial application of the invention. For example, it was found that the lens/lamp unit occasionally worked loose from the battery shell due to vibration of the vehicle and handlebar. Furthermore, excessive twisting of the lens and lamp tended to fracture the lamp where the lamp bulb joins the lamp base. Moreover, wide variations of handlebar inside diameters are such that a single rectangular shell geometry could not accommodate all conventional handlebar configurations. Finally, it was found that the overall length of the shell/lamp/lens combination was such that it could not be readily employed in certain handlebars having a very short end section before a tight bend.

SUMMARY OF THE INVENTION

It is a general object of the present invention to provide a signal light for bicycles and the like vehicle which is economical to manufacture and market, which is rugged in use, and which may be readily installed and removed for battery replacement by relatively unskilled personnel. It is a further and more specific object of the invention to provide a signal light of the described character which overcomes the forementioned problems encountered in commercial application of the light disclosed in the copending application of the inventors herein. It is a further object to provide a handlebar signal light which has about 270° visibility from the rear of the bike to both sides.

BRIEF DESCRIPTION OF THE DRAWINGS

The invention, together with additional objects, features and advantages thereof, will be best understood from the following description, the appended claims and the accompanying drawing in which:

FIG. 1 is a fragmentary partially sectioned elevational view of a handlebar end into which a safety light in accordance with the invention has been assembled;

FIGS. 2-4 are sectional views taken substantially along the respective lines 2—2, 3—3 and 4—4 in FIG. 1;

FIG. 5 is a perspective view of the light switch element of the present invention;

FIG. 6 is a rear perspective view of the lens illustrated in FIGS. 1 and 3;

FIG. 7 is a fragmentary view similar to that of FIG. 1 but showing the safety light of the present invention in section; and FIG. 8 is a sectional view taken substantially along the line 8—8 in FIG. 7.

DESCRIPTION OF THE PREFERRED EMBODIMENT

Referring to the drawing a presently preferred embodiment 20 of the signal light of the present invention is illustrated as comprising a hollow cylindrical shell 22 formed by an opposed pair of semi-cylindrical shell sections 24, 26. Shell 22, which is of opaque electrically non-conductive construction such as plastic, has open ends, and has a circumferential array of orthogonally spaced longitudinally extending resilient arcuate ribs 28 integrally projecting outwardly of the shell body between the open shell ends at identical angles with respect thereto. Ribs 28 may be formed by striking or bending wall portions of the respective shell sections 24, 26 radially outwardly, such that ribs 28 possess a radius of curvature identical to that of the shell sections. The axial edge 30 of each rib 28 remote from the outer end of shell 22 is angulated or sloped inwardly toward the shell body, as best seen in FIG. 1. (All directional adjectives, such as "inner" and "outer," are taken with reference to the open end of handlebar 32, and are by way of description only.) The inner ends of shell sections 24, 26 are tapered or undercut, as best seen in FIGS. 1 and 7, to form laterally opposed V-shaped slots 34. The shell may also be extruded as a tube and the fins may be straight and will assume a curved configuration when forced into a handlebar end depending on the size of the opening.

A pair of battteries 36, 38, preferably AA-size batteries, are closely and serially captured within shell 22 so as to position battery contacts of opposite electrical polarity adjacent to the open shell ends. A strip 40 of electrically conductive resilient metallic construction, such as spring brass or a wire, extends axially along shell 22 externally thereof. A V-shaped leg 42 extends orthogonally of strip 40 radially across shell 22 at the open inner end thereof through radially aligned apertures 43 in the opposing shell walls. An axially extending foot 44 at the free end of leg 42 is positioned externally of the adjacent shell wall so as to releasably hold the shell half-sections in opposed relation. The intermediate reach of leg 42 tapers or extends outwardly and electrically abuts or engages the opposing terminal of battery 38 to resiliently urge batteries 38, 36 against arcuate shoulders 46 adjacent to the open outer end of shell 22.

A lamp 48 of conventional off-the-shelf construction includes a base 50 received in the open outer end of shell 22, and a bulb 52 carried by base 50 externally of shell 22. A translucent lens 54 comprises a hollow hemispherical head axially received by interference press-fit over the open outer end of shell 22 for internally capturing the bulb 52 of lamp 48 and urging lamp base 50 against the opposing contact terminal of battery 36, while simultaneously holding the outer ends of shell segments 24, 26 in opposed assembled relation. An axially extending rib 56 on the outer surface of shell segment 26 adjacent to the outer end of shell 22 cooperates with an axial slot 58 in the internal bore of lens 54 for rotationally aligning lens 54 with respect to shell 22 and for preventing rotation of lens 54 with respect thereto.

The outer end of conductive strip 40 includes a stepped bend 58 which extends through an aperture 59 in shell section 24 so as to be normally positioned adjacent to the inner surface of shell section 24 parallel to but radially spaced from base 50 of lamp 48, as best seen in FIG. 3. A lamp switch 60 includes a flat base 62 laterally slidably received in a slot 64 which extends across lens 54 at a position radially spaced from the lens internal bore. A tab 66 integrally orthogonally depends from base 62 through an aperture 67 in shell section 24 to a position radially outwardly of strip bend 58. Tab 66 has an angulated cam surface 68 remote from switch base 62 which externally radially engages bend 58 of strip 40. The dimension of aperture 67 (FIG. 3) laterally of the axis of shell 22 is coordinated with angle of cam surface 68 and radial spacing between bend 58 and lamp base 50 such that sliding motion of switch base 62 selectively urges or cams strip bend 58 against lamp base 50 in the position of FIGS. 7 and 8, or releases strip bend 58 from such abutting electrical engagement with lamp base 50 so as to permit resilient return of bend 58 to the position of FIG. 3 radially spaced from lamp base 50. In the position of FIGS. 7 and 8, a circuit is thus completed through batteries 36, 38, strip 40 and lamp 48 such that lamp 48 is energized, whereas return of switch 60 and strip bend 58 to the position of FIG. 3 breaks such electrical circuit.

Signal lamp 20 of the present invention may be sold to original equipment manufacturers or in the aftermarket in pairs as a package, with different color lenses 54 and with handlebar external grips 70, if desired. In assembly, batteries, 36, 38 are placed between shell sections 24, 26, the shell sections are brought into opposed assembled orientation, and strip leg 42 fastened thereto. Lamp 48 is then inserted into the open outer shell end. Switch element 60 is assembled to shell 22 with tab 66 projecting through aperture 67, and lens 54 is press-fitted over the open shell end so as to capture switch 60 and lamp 48 in assembly as previously described. The assembly is then press fitted into the open end of handlebar 32. In this respect, edges 30 of ribs 28 assist such press-fit insertion, and the inner surface of handlebar 32 engages and resiliently urges ribs 28 radially inwardly. Thus, ribs 28 function simultaneously to retain shell 22 and signal light 20 on the end of handlebar 32 and to center shell 22 therewithin. It will be appreciated, of course, that angulated construction of ribs 28 readily accommodate a wide range of handlebar inside diameters. Shell slots 34 allow deeper insertion into a curved handlebar to position lens 54 against the handlebar end. When batteries 36, 38 require replacement, the entire assembly is withdrawn from the handlebar end, and leg 42 of strip 40 is released. Shell segments 24, 26 may then be pivoted outwardly with respect to lens 54 so as to permit removal and replacement of batteries 36, 38.

The invention claimed is:

1. A signal light for bicycle and like applications having a handlebar with open tubular ends, said signal light comprising
a cylindrical battery shell having axially spaced ends, a circular opening at one end, and a circumferential array of spaced axially extending resilient ribs integrally projecting outwardly of said shell at angles thereto between said ends,
battery means captured within said shell so as to position battery contacts adjacent to said spaced ends of said shell,
a lamp having a base received in said circular shell opening and a bulb carried by said base externally of said shell, and
a lens having a hollow contoured head affixed to said shell at said one end enclosing and capturing said bulb,
said ribs being of identical construction and having axial edges spaced from said one shell end which slope rearwardly toward said shell so as to facilitate press-fit insertion of said shell into a handlebar end,
said ribs being of radially inwardly concave arcuate cross section of uniform thickness axially of said shell and having radii of curvature equal to that of said shell,
said ribs having an outer diameter for resilient press-fit insertion of said shell into a handlebar end such that said ribs function both to retain said shell in the handlebar end, to center in said shell therein, and to adapt to various size openings in the handlebars.

2. The signal light set forth in claim 1 wherein said shell and said lens include means for preventing rotation of said lens with respect to said shell.

3. The signal light set forth in claim 2 wherein said shell is of electrically non-conductive construction, and wherein said signal light further comprises electrically conductive means including means making electrical contact with the battery contact at the end of said shell spaced from said one end and extending along said shell to adjacent said lamp base, and switch means for selectively contacting said conductive means to said lamp base so as to close an electrical circuit from said battery means through said lamp.

4. The signal light set forth in claim 3 wherein said conductive means comprises a conductive metal strip or wire having a first end adjacent to said one shell end radially spaced from said lamp base, and
wherein said switch means comprises means extending through said shell adjacent to said one shell end for resiliently contacting said one strip end against said base.

5. The signal light set forth in claim 4 wherein said switch means comprises a switch base laterally slidably carried by said lens externally of said shell, a tab integrally radially projecting from said switch base through an opening in said shell into abutting engagement with said one strip end, and an angulated radially-facing cam surface on said tab engaging said one strip end for moving said one strip end radially inwardly and outwardly with respect to said lamp base as a function of lateral sliding motion of said switch base in said lens.

6. The signal light for bicycle and like applications having a handlbar with open tubular ends, said signal light comprising a cylindrical battery shell of electrically non-conductive construction having axially spaced ends, a circular opening at one end, and a circumferential array of spaced axially extending resilient ribs integrally projecting outwardly of said shell at angles thereto between said ends, said ribs being of identical construction and having axial edges spaced from said one shell end which slope rearwardly toward said shell so as to facilitate press-fit insertion of said shell into a handlebar end, said ribs having an outer diameter for resilient press-fit insertion of said shell into a handlebar end such that said ribs function both to retain said shell in the handlebar end, to center in said shell therein, and to adapt to various size openings in handlebars, battery means captured within said shell so as to position battery contacts adjacent to said spaced ends of said shell, a lamp having a base received in said circular shell opening and a bulb carried by said base externally of said shell, a lens having a hollow contoured head affixed to said shell at said one end enclosing and capturing said bulb, said shell and said lens including means for preventing rotation of said lens with respect to said shell, a condcutive metal strip or wire having a first end adjacent to said one shell end radially spaced from said lamp base and means making electrical contact with the battery contact at the end of said shell spaced from said one end and extending along said shell to radially adjacent said lamp base, and switch means comprising a switch base laterally slidably carried by said lens externally of said shell, a tab integrally radially projecting from said switch base through an opening in said shell into abutting engagement with said one strip end, and an angulated radially-facing cam surface on said tab engaging said one strip end for moving said one strip end radially inwardly and outwardly with respect to said lamp base as a function of lateral sliding motion of said switch base in said lens, and thereby selectively resiliently contacting said conductive means to said lamp base so as to close an electrical circuit from said battery means through said lamp.

7. The signal light set forth in claim 6 wherein said conductive metal strip extends externally of said shell and has a radial leg at a second end remote from said one end which projects laterally through said shell in resilient abutment with the adjacent battery contact.

8. The signal light set forth in claim 7 wherein said shell comprises a pair of diametrically opposed semi-cylindrical shell half-sections, said second strip end extending through apertures in said shell half-sections and having an axially extending free end which resiliently holds said shell half-sections in opposed engagement to capture said battery means.

9. A signal light for bicycle and like applications having a handlebar with open tubular ends, said signal light comprising a battery shell of electrically non-conductive construction having axially spaced ends, a circular opening at one end, and means for press-fit insertion and retention of said shell into a handlebar end, battery means captured within said shell so as to position battery contacts adjacent to said axially spaced ends of said shell, a lamp having a base received in said circular opening in abutting electrical contact with an adjacent battery contact and a bulb carried by said base externally of said shell, a lens having a hollow lead received by press-fit onto said one shell end over said bulb and being held against rotation with respect to said shell, a strip of resilient electrically conductive metal stock having a first end adjacent to said one shell and spaced radially of said lamp base, and a second end remote from said one end in electrical contact withh said battery means, and switch means carried by said lens and projecting into said shell for selectively urging said one strip end into abutting electrical contact with said lamp base, said switch means comprising a switch base laterally slidably carried by said lens externally of said shell, a tab integrally radially projecting from said switch base through an opening in said shell into abutting engagement with said one strip end, and an angulated radially-facing cam surface on said tab engaging said one strip end for moving said one strip end radially inwardly and outwardly with respect to said lamp base as a function of lateral sliding motion of said switch base in said lens.

10. The signal light set forth in claim 9 wherein said conductive metal strip extends externally of said shell and has a radial leg at a second end remote from said one end which projects laterally through said shell in resilient abutment with the adjacent battery contact.

11. The signal light set forth in claim 10 wherein said shell comprises a pair of laterally opposed semi-cylindrical shell half-sections, said second strip end extending through apertures in said shell half-sections and having an axially extending free end which resiliently holds said shell half-sections in opposed engagement to capture said battery means.

12. The signal light set forth in claim 9 wherein said means for press-fit insertion and retention comprises a circumferential array of spaced axially extending resilient ribs interally projecting outwardly of said shell at angles thereto between said shell ends, said ribs having an outer diameter for resilient press-fit insertion of said shell into a handlebar end such that said ribs function both to retain said shell in the handlebar end and to center said shell therewithin.

13. The signal light set forth in claim 12 wherein said ribs are of identical construction and have axial edges spaced from said one shell end which slope rearwardly toward said shell so as to facilitate press-fit insertion of said shell into a handlebar end.

* * * * *